United States Patent [19]

Bassous et al.

[11] 4,007,464

[45] Feb. 8, 1977

[54] INK JET NOZZLE

[75] Inventors: Ernest Bassous, Riverdale; Lawrence Kuhn, Ossining; Arnold Reisman, Yorktown Heights; Howard H. Taub, Mount Kisco, all of N.Y.

[73] Assignee: International Business Machines Corporation, Armonk, N.Y.

[22] Filed: Jan. 23, 1975

[21] Appl. No.: 543,600

[52] U.S. Cl. .................................. 346/75; 239/601; 346/140 R

[51] Int. Cl.[2] ........................................ G01D 15/18

[58] Field of Search ............. 346/140, 75; 239/601; 29/157 C; 222/566, 575

[56] References Cited

UNITED STATES PATENTS

| | | | |
|---|---|---|---|
| 2,676,868 | 4/1954 | Jacob | 346/75 |
| 3,512,173 | 5/1970 | Damouth | 346/75 |
| 3,823,408 | 7/1974 | Gordon | 346/140 |
| 3,877,036 | 4/1975 | Loeffler et al. | 346/75 |
| 3,921,916 | 11/1975 | Bassous | 346/75 X |
| 3,949,410 | 4/1976 | Bassous et al. | 346/75 |

OTHER PUBLICATIONS

Lane, R; Fabricating an Ink Jet Nozzle; IBM Tech. Disc. Bulletin, vol. 16, No. 10, Mar. 1974, p. 3413.

Krause, K. A.; Focusing Ink Jet Head, IBM Tech. Disc. Bulletin, vol. 16, No. 4, Sept. 1973, p. 1168.

*Primary Examiner*—Joseph W. Hartary
*Attorney, Agent, or Firm*—Jack M. Arnold

[57] ABSTRACT

In an ink jet printing system, a single nozzle or an array of nozzles are etched in a semiconductor material such as silicon. Each nozzle has polygonal or N-sided entrance and exit apertures of different cross-sectional area. Preferably, the nozzle is in the shape of a truncated pyramid with the entrance and exit apertures being substantially square in cross-section. The corners of the apertures and wall interfaces may be rounded to reduce stress concentrations.

20 Claims, 24 Drawing Figures

INK JET NOZZLE

CROSS-REFERENCE TO RELATED APPLICATIONS

Reference is made to U.S. Pat. No. 3,921,916, entitled "Nozzles Formed in Monocrystalline Silicon", filed Dec. 31, 1974 on behalf of Ernest Bassous, which patent is assigned to the assignee of the present invention.

The Bassous patent is directed to a nozzle formed in a semiconductor substrate. The nozzle has a rectangular entrance aperture on one face of the substrate which tapers to a membrane which is coextensive with the other face of the substrate. An exit aperture, preferably circular in shape, is formed in the membrane.

BACKGROUND OF THE INVENTION

In the prior art, single jet nozzles or arrays of jet nozzles which, for example, may be used in ink jet printers, are approximately tubular in shape. These nozzles are formed by drilling holes in plates by mechanical or electromechanical means, by the use of an electron beam or laser or the like. The plates, for example, are made of stainless steel, glass or quartz, vitreous carbon, jewels such as sapphire and the like. The technique set forth above for forming nozzles or arrays of nozzles suffer from at least some of the following disadvantages, namely: (1) holes are formed one at a time, (2) control of the individual size and shape of nozzles is relatively poor; (3) fabrication of arrays of such nozzles is even more difficult, with attendant nonuniformity of hole size, shape and spatial distribution of the array.

In ink jet printing applications, a jet of ink is formed by forcing ink under pressure through a nozzle. The jet of ink can be made to break up into droplets of substantially equal size and spacing by vibrating the nozzle or by otherwise creating a periodic pressure or velocity perturbation on the jet, preferably proximate to the nozzle orifice. Printing is effected by controlling the flight of the droplets to a target such as paper. Important characteristics for ink jet printing applications are the size of respective nozzles, spatial distribution of the nozzles in an array, and the means for creating the periodic perturbations on the jet. Such factors affect velocity uniformity of fluid emitted from the respective nozzles; directionality of the respective droplets, that is, the directional alignment of the respective fluid streams with respect to parallel alignment; and break-off distance of individual droplets, that is, the distance between the exit aperture of a nozzle and the position at which a droplet is formed.

According to the present invention, a jet nozzle or an array of such nozzles having appropriate jet orifice characteristics are fabricated from a semiconductor such as a single crystalline region of silicon by chemical etching techniques. Etching technology suitable for establishing structures of a given geometry in single crystalline silicon include U.S. Pat. No. 3,770,553, issued Nov. 6, 1973, which is directed toward a method for producing high resolution patterns in single crystals of silicon. There is, however, no teaching in the referenced patent concerning the use of the disclosed etching techniques for etching completely through a substrate of silicon or for fabricating jet nozzle structures in silicon.

Also according to the present invention, individual nozzles or an array of such nozzles are batch fabricated easily due to the crystallographic perfection of the starting material, namely the semiconductor used, and the selectivity of the etchant. There is a high degree of control of nozzle size resulting from precise control of processes used in fabrication, namely the formation of openings in thin films by photolithographic techniques and control of etch rates of semiconductor materials as a function of crystallographic orientation; and etching characteristics of anisotropic etching solutions as a function of their composition, temperature and the process environmental characteristics.

The fluid flow properties of the nozzle of the present invention are superior to those of pipes due to the minimization of wall effects. The wall effects are minimized since the nozzle according to the present invention is tapered from the entrance orifice to the exit orifice. The superior flow characteristics result in more uniform distribution of velocity across an array of jets operating from a common manifold.

Another advantage of the nozzle of the present invention is that inspection of a given nozzle may be accomplished visually, and such inspection is sufficient to anticipate the performance of the inspected nozzle. That is, the nozzle is inspected for orifice size and integrity of the structure without having to actually check the performance of the nozzle in an ink jet printer. In tubular shaped nozzles it is difficult, if not impossible, to see inside the nozzle.

The nozzle of the present invention may pass fluid in either direction, but in the preferred mode of operation fluid flow is in the direction of the larger opening to the smaller opening of the nozzle which results in less pressure drop.

The directionality of the jet is closely related to the directions in the crystallographic planes of the substrate material resulting in more uniform directional characteristics for an array than might otherwise be achievable.

SUMMARY OF THE INVENTION

According to the present invention, an ink jet printing system is disclosed which includes a source of pressurized ink, manifold means which communicate with the source and means for perturbing the ink at a substantially uniform frequency. Finally, there is a single nozzle or an array of nozzles, each having an N-sided entrance aperture which communicates with the manifold means for receiving ink under pressure, with each nozzle having an N-sided exit aperture having a cross-sectional area which is different than the cross-sectional area of the entrance aperture for emitting a stream of ink initially having an essentially N-sided cross-section, with the stream oscillating in response to the surface tension on the stream for changing from an essentially N-sided cross-section to an essentially circular cross-section at a distance from the exit aperture which is less than the distance at which the stream breaks up to form uniformly spaced ink droplets. For an array of nozzles, each individual fluid stream breaks up to form droplets at substantially the same distance from the respective exit apertures, with the respective streams of droplets being in substantial parallel alignment with one another.

DETAILED DESCRIPTION OF THE INVENTION

Figure 1A:
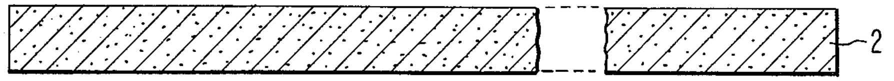
FIGS. 1A–1H represent sequential cross-sectional views of a silicon wafer processed in accordance with the present invention for forming jet nozzles.

According to the present invention, a jet nozzle or a uniform jet nozzle array is fabricated in a semiconductor material using conventional semiconductor processing techniques. The preferred semiconductor material is silicon, however it is to be appreciated that other semiconductor materials such as germanium, gallium arsenide or the like may be utilized in the process of the present invention. Also, the nozzles which have polygonal entrance and exit apertures and a tapered geometry may be formed in glass, plastic, metals, etc. The processing technique used in the preferred embodiment, that is, for silicon, utilizes an anisotropic chemical etchant for generating holes of desired geometries in the semiconductor material. The preferred geometry is that the hole is in the shape of a truncated pyramid having a rectangular entrance aperture which tapers to a rectangular exit aperture. In practice, the entrance and exit apertures are substantially square in cross-section, although it is to be appreciated that rectangular nozzles having side dimensions which are different may be desirable for certain applications. In practice, the corners of the apertures may be rounded off to minimize stress concentrations which may result in failure or excessive wear of a nozzle. It is to be appreciated, however, that the apertures may have other geometries such as hexagonal, triangular, etc. The excellent performance characteristics of the present nozzle or an array of such nozzles is directly related to the influence of crystal symmetry on the geometry of the nozzle which results in the nozzle having uniform directional characteristics and is also related to the taper which results in uniform velocity characteristics and high nozzle efficiency.

As is known, anisotropic etchants attack crystalline materials at different rates in different crystallographic directions. Numerous anisotropic etchants are known for monocrystalline silicon which include alkaline liquids or mixtures thereof. As common single crystal silicon anisotropic etchants, there may be mentioned aqueous sodium hydroxide, aqueous potassium hydroxide, aqueous hydrazine tetramethyl ammonium hydroxide, mixtures of phenols and amines such as a mixture of pyrocatechol and ethylene diamine with water, and mixtures of potassium hydroxide, N-propanol and water. These and other preferential etchants for monocrystalline silicon are usable in the process of the present invention for forming jet nozzles.

With respect to the three most common low index crystal planes in monocrystalline silicon, the anisotropic etch rate is greatest for (100) oriented silicon, somewhat less for (110) and is least for (111) oriented silicon.

FIGS. 1A–1H illustrate one exemplary sequence of process steps to produce an aperture or hole in a single crystal silicon wafer for forming a jet nozzle or an array of such jet nozzles. It is to be appreciated that the following process steps may be used in a different sequence. Also, other film materials for performing the same function below may also be used. Further, film formation, size, thickness and the like may be varied.

Figure 1B:
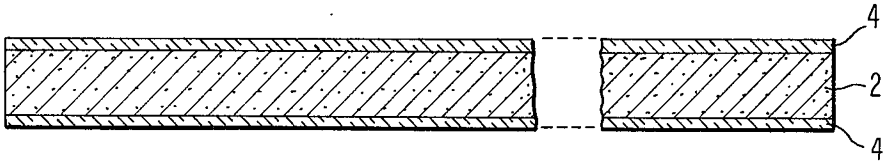
Figure 1C:
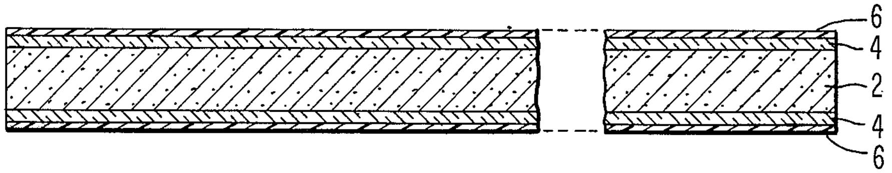
Figure 1D:
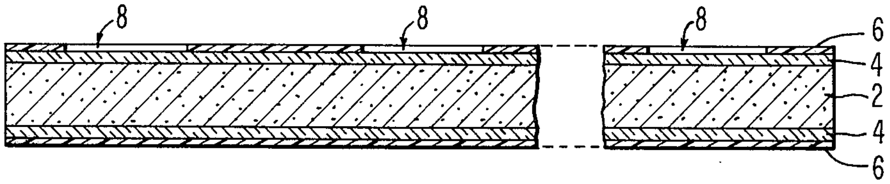
Figure 1E:
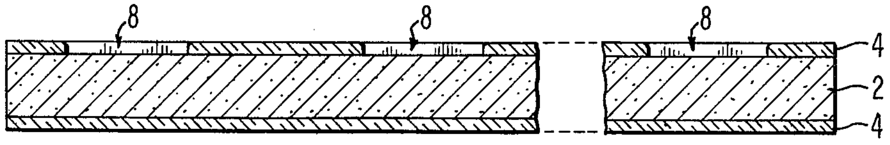
Figure 1F:
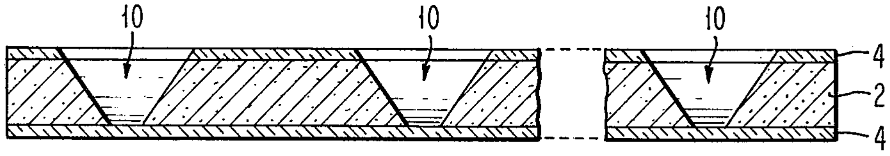
Figure 1G:
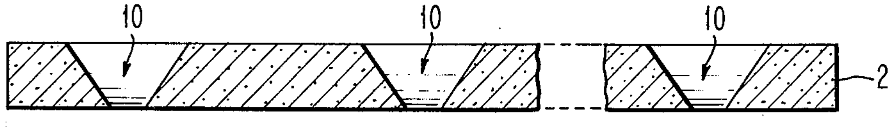
Figure 1H:
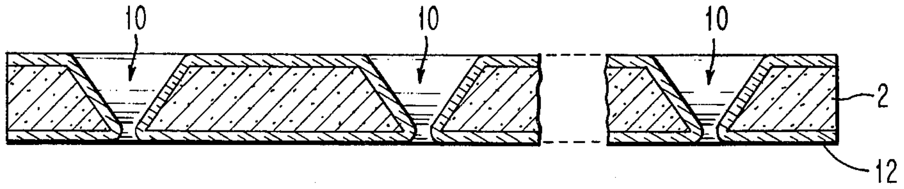

The fabrication steps for forming a single jet nozzle or an array of jet nozzles according to the present invention is carried out in the following sequence. As shown in FIG. 1A, a silicon wafer 2 having a standard chemically-mechanically polished surface of p- or n-type having (100) orientation is first cleaned. Next, as shown in FIG. 1B, the silicon wafer 2 is oxidized in steam at 1000° C to form an $SiO_2$ film 4 ~ 4500 A thick on the wafer. Next, as shown in FIG. 1C, the oxidized wafers are then coated with a photoresist material 6 on the front and back of each wafer. Next, as shown in FIG. 1D, a nozzle base hole pattern 8 is exposed and developed in the photoresist layer 6. Then, as illustrated in FIG. 1E, the $SiO_2$ layer in the opening 8 is etched away in buffered hydrofluoric acid, and then the photoresist 6 is stripped from both sides of the wafer. As shown in FIG. 1F, the silicon is then etched from the opening 8 in an anisotropic etchant, for example a solution containing ethylene diamine, pyrocatechol and water, at 110°–120° C to form the tapered opening 10 in the wafer 2. Etching is stopped when orifices appear on the lower side of the wafer. The etching period is generally on the order of three to four hours for a substrate on the order of 8 mils thick. As shown in FIG. 1G, the $SiO_2$ layer 4 is etched from the wafer 2 resulting in a silicon wafer with a truncated pyramid type opening 10 appearing therein. The wafer 2 then has an $SiO_2$ film 12 grown thereon by oxidation as illustrated in FIG. 1H. The oxide layer 12 helps to prevent corrosion by the inks used in the ink jet printer. It is to be appreciated that other corrosion-resistant films may be used.

Figure 2A:
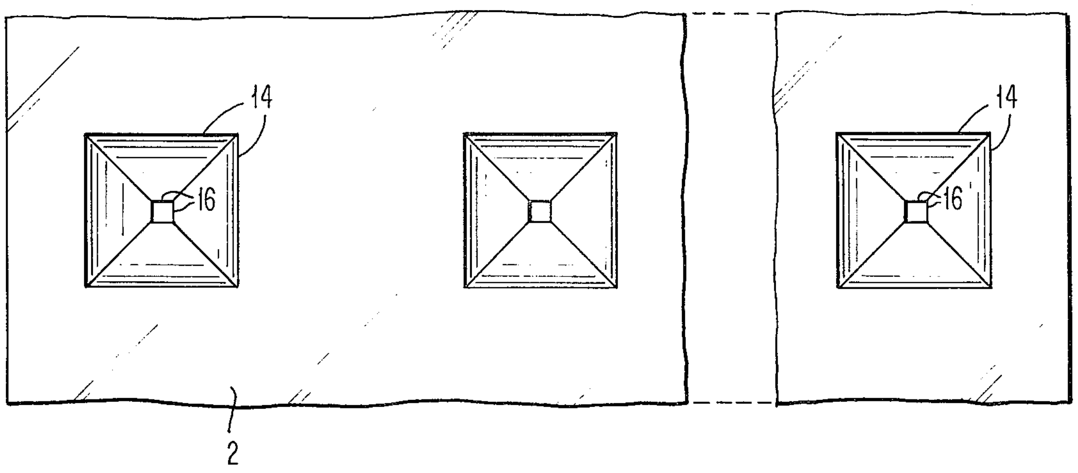
FIGS. 2A and 2B illustrate a plan view of semiconductor jet nozzles according to the present invention.
Figure 2B:
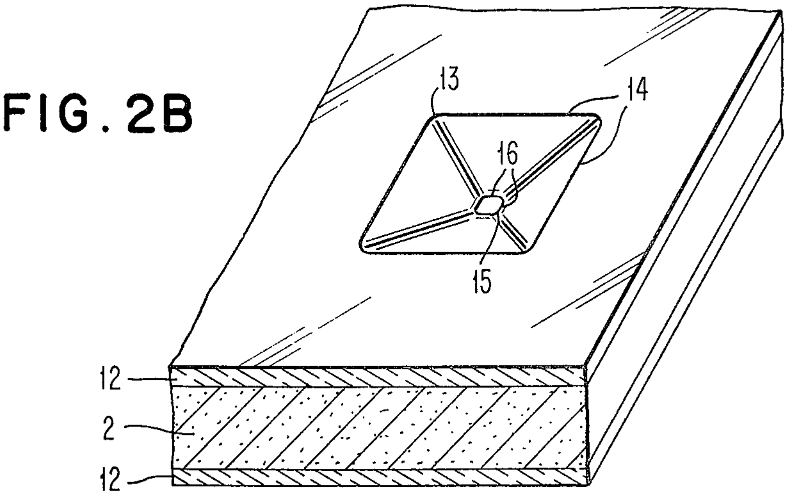

FIGS. 2A and 2B are plan views of the nozzles which are etched in the silicon wafer 2, with each nozzle having a polygonal or N-sided entrance and exit aperture of different cross-sectional area. For the nozzle illustrated, the entrance and exit apertures are four-sided and the nozzle takes the shape of a truncated pyramid. That is, the nozzle has a rectangular entrance aperture defined by lines 14 which tapers to a rectangular exit aperture defined by the lines 16. Preferably, the entrance and exit apertures are approximately square. In FIG. 2B, the corners of the apertures are shown as round at 13 and 15, respectively. The corners and wall interfaces are rounded by etching or other suitable techniques to minimize stress concentrations. The stress minimization results in a reduction of excessive wear and resultant failure of the nozzle. It is to be appreciated, however, that the nozzle of the present invention may have different geometries. For example, the nozzle may have hexagonal or triangular or other exit and entrance geometries dependent on the semiconductor used, the crystallographic orientation, and etchants used.

It may be seen that an individual nozzle or an array of nozzles as illustrated may be easily inspected under an optical microscope for determining if there are any obvious defects in a given nozzle, without having to actually test the nozzle or an array in an ink jet printing system since there are no hidden surfaces. The defects that may be looked for, for example, may be chipped edges on the entrance or exit apertures, crystallite growth or other non-uniformity in the interior of the nozzles, or variations in the respective positionings of the nozzles across the array. The open pyramid shape of the silicon nozzle allows all surfaces to be inspected and the nozzle or nozzle array selected or rejected on this basis. Since the cost of testing nozzles for product applications is perhaps the greatest part of a nozzle's cost, significant savings may be achieved by utilizing nozzle arrays according to the present invention.

Typical characteristics of the described nozzle in ink jet printing applications are as follows. At fluid velocity of about 500 inches/sec, the breakoff uniformity of an array of nozzles, for example 8 nozzles, is less than about 3 jet diameters. Velocity uniformity is better than ± 2-½ inch/sec, and the directionality is within ± 2 milliradian of parallel alignment. The efficiency of the tapered nozzle is superior to tubular nozzles as distinguished by the minimal drop in fluid pressure from the entrance aperture to the exit aperture.

Figure 3:
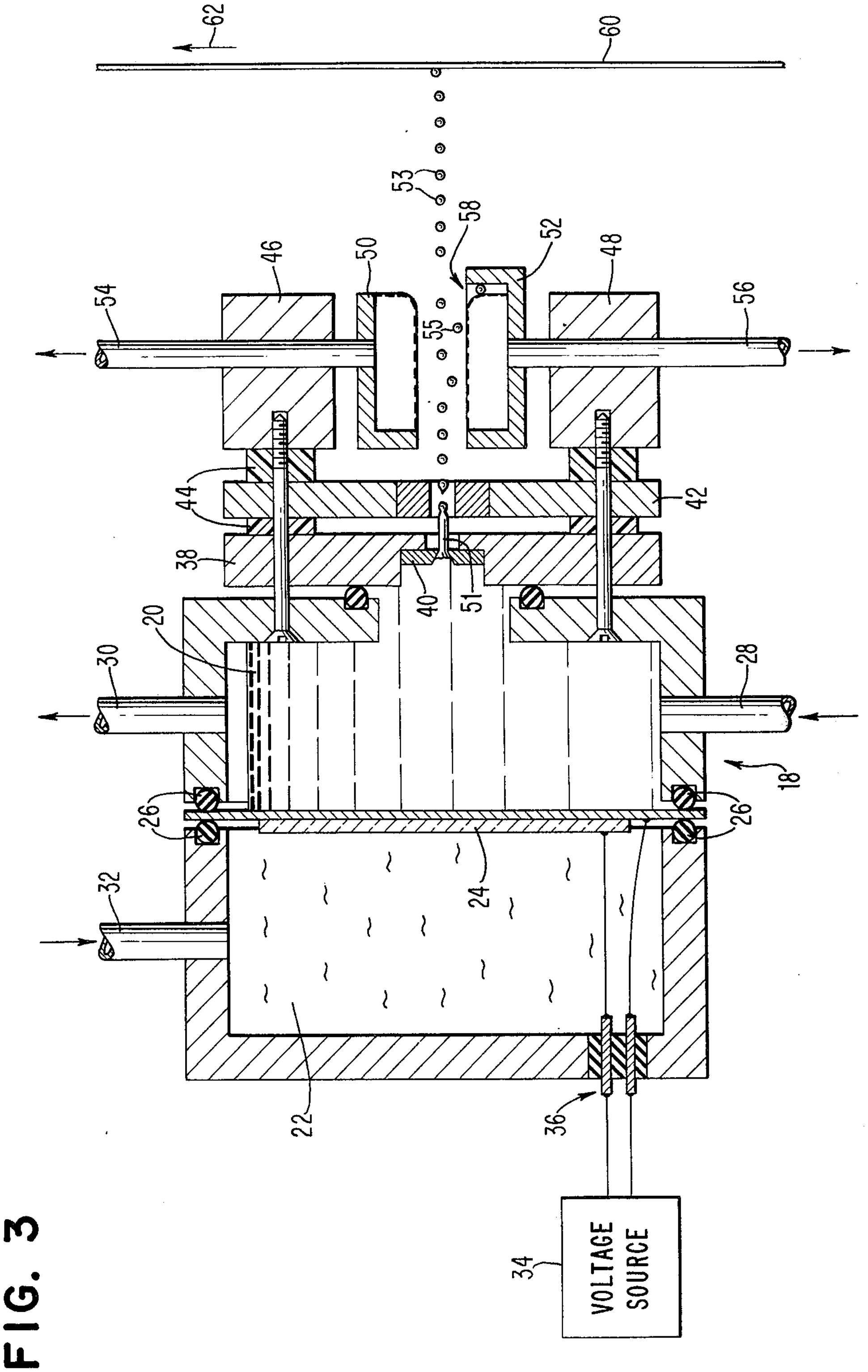
FIG. 3 is a cross-sectional view of an ink jet printing system including a jet nozzle in accordance with the present invention.

Refer now to FIG. 3 which is a sectional view of an ink jet printing system accoding to the present invention. A fluid source manifold 18 is comprised of an ink chamber 20 and a gas chamber 22 which are separated by a piezoelectric driver 24 which is spaced between the respective chambers by means of O-rings 26. Ink is supplied to the chamber 20 by an ink input port 28 from an ink source (not shown) and an air bleed port 30 is also formed in the ink chamber 20 for bleeding air and flushing ink. The gas chamber 22 has gas supplied from a source (not shown) to an input port 32 for equalizing pressure between the respective chambers. A source of voltage 34 supplies voltage via connection 36 to the piezoelectric driver 24 for vibrating the driver such that perturbations are produced in the ink in the chamber 20 for inducing uniform droplet formation of ink emitted from the chamber as is described shortly. A nozzle mounting plate 38 is attached to the ink chamber 20 and has secured therein a nozzle chip 40 which has a nozzle according to the present invention formed therein. A charge electrode structure 42 is spaced from the nozzle mounting plate 38 by means of spacers 44. Spacers 44 are also secured to mounting members 46 and 48, which support deflection plates 50 and 52 by way of fluid return lines 54 and 56, respectively. The ink under pressure in chamber 20 is emitted in the form of a stream 51 which breaks up into droplets in response to the perturbations caused in ink by means of the vibrations set up by the piezoelectric driver 24. The charge electrode structure charges droplets which are not to be used for printing by way of charging means (not shown). The droplets are then passed between deflection electrodes 50 and 52 for receiving deflection voltages such that the uncharged droplets 53 travel to predetermined positions on target paper 60 which is moving in the direction of arrow 62. Charged droplets 55 are caught by catcher assembly 58 and returned via fluid return line 56 to a fluid source (not shown).

Figure 4A:
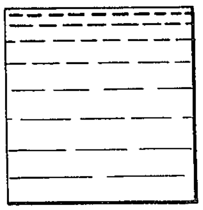
FIGS. 4A–4D illustrate sequential cross-sectional views of a fluid stream exiting from a rectangular tapered nozzle.
Figure 4B:
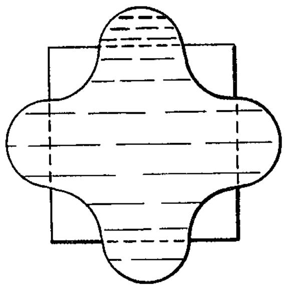
Figure 4C:
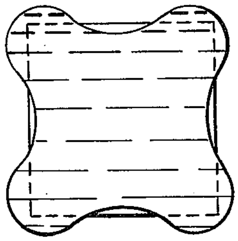
Figure 4D:
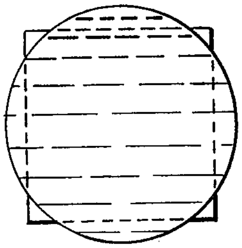

Refer now to FIGS, 4A–4D which illustrate the various sequential cross-sectional shapes taken by the fluid jet in transforming from an N-sided cross-section to a substantially circular cross-section by virtue of viscous damping of the oscillations at a distance from the nozzle exit aperture which is usually less than the distance at which the stream breaks up to form uniformly spaced ink droplets. In FIG. 4A the cross-section of the ink stream at the exit aperture is illustrated as N-sided in conformance with the N-sided cross-section of the exit aperture. For the case of a rectangular exit orifice, the stream is essentially rectangular in cross-section. As the stream issues from the exit aperture the surface tension forces on the respective corners of the stream cause the stream to sequentially oscillate as shown in FIG. 4B and 4C, with the stream then essentially becoming circular in cross-section due to the viscous damping of the oscillations as illustrated in FIG. 4D. It has been found that the period of oscillation is independent of the jet velocity, and further it has been found that after four or five oscillations the stream assumes an essentially circular cross-section. For an essentially square nozzle with a side dimension of approximately 1 mil, this occurs at a distance of about 20 mils from the nozzle for a drop velocity of 700 in/sec. At this velocity, the distance to drop break off is about 75 mils for typical printer operation.

Figure 5:
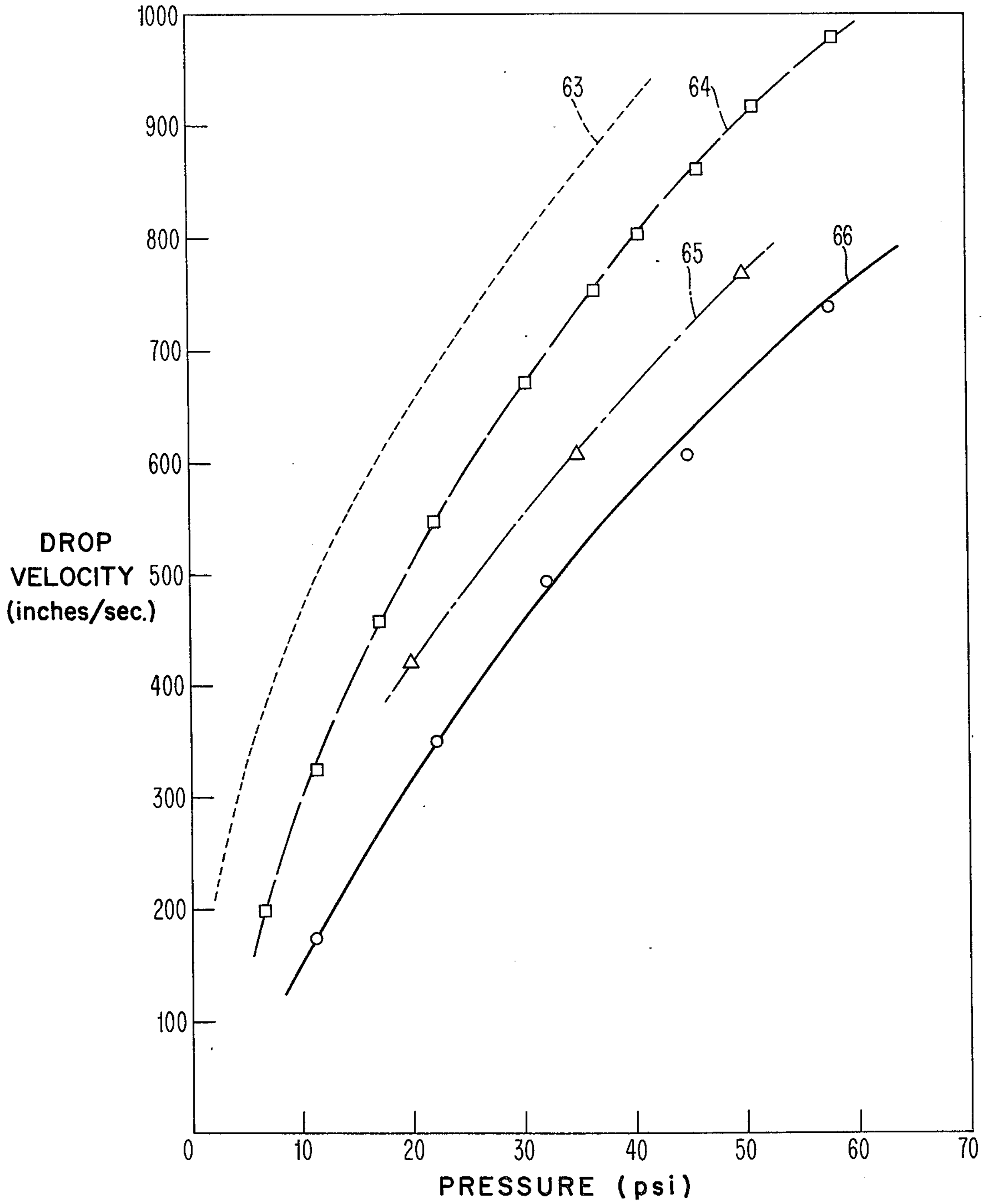
FIG. 5 is a graph illustrating the velocity characteristics of a fluid stream as a function of pressure for different type nozzles.

The design specifications of a multi-nozzle ink jet printer are primarily concerned with uniformity of jet direction, velocity and drop formation. Rectangular tapered silicon nozzles according to the present invention have been found to have excellent velocity and directionality characteristics as a result of their tapered geometry. When compared with nozzles in the shape of cylindrical pipes, the tapered nozzles according to the present invention require lower pressures to obtain a given drop velocity for a specified jet diameter. This is illustrated in FIG. 5, which compares drop velocity versus pressure curves for a silicon nozzle in the shape of a truncated pyramid and for tubular nozzles of varying diameter and of varying length. Curve 63 illustrates the theoretical pressure-velocity characteristic for an ideal nozzle ($P = \frac{1}{2} \rho V^2$, where $\rho$ and V are density and velocity, respectively). Curve 64 represents the velocity characteristic for a tapered single silicon nozzle having a square exit aperture of approximately 1 mil on each side; a circular nozzle of equal area has a diameter of approximately 1.2 mils. Curve 65 is the velocity characteristic for a tubular nozzle having a diameter of 1.4 mils and a length of 2.2 mils, and curve 66 is the velocity characteristic for a tubular nozzle having a diameter of 1.3 mils and a length of 8.5 mils. The graph illustrates that the drop velocity for a square tapered silicon nozzle is greater than that of tubular nozzles of varying lengths and comparable diameters, and most closely approaches the ideal velocity curve as illustrated by curve 63. The drop velocity is substantially uniform for rectangular tapered silicon nozzles in an array. This uniformity results from the relative insensitivities of the drop velocity to the relative variations in nozzle size for the tapered rectangular nozzles in an array. Break off characteristics have also been found to be substantially uniform for uniform perturbation conditions. Further, an array of such nozzles exhibit good directional properties.

Figure 6:
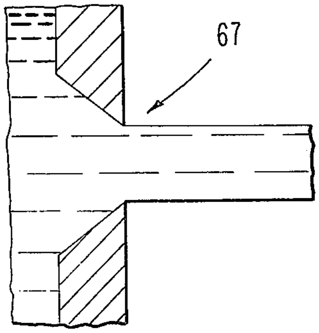
FIG. 6 illustrates fluid flow in the normal direction through a jet nozzle according to the present invention.
Figure 7:
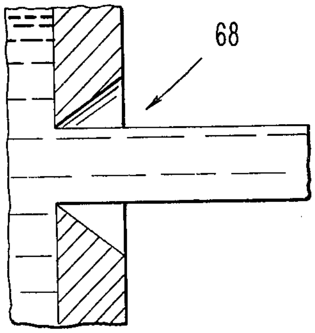
FIG. 7 illustrates fluid flow in the reverse direction through a jet nozzle according to the present invention.
Figure 8:
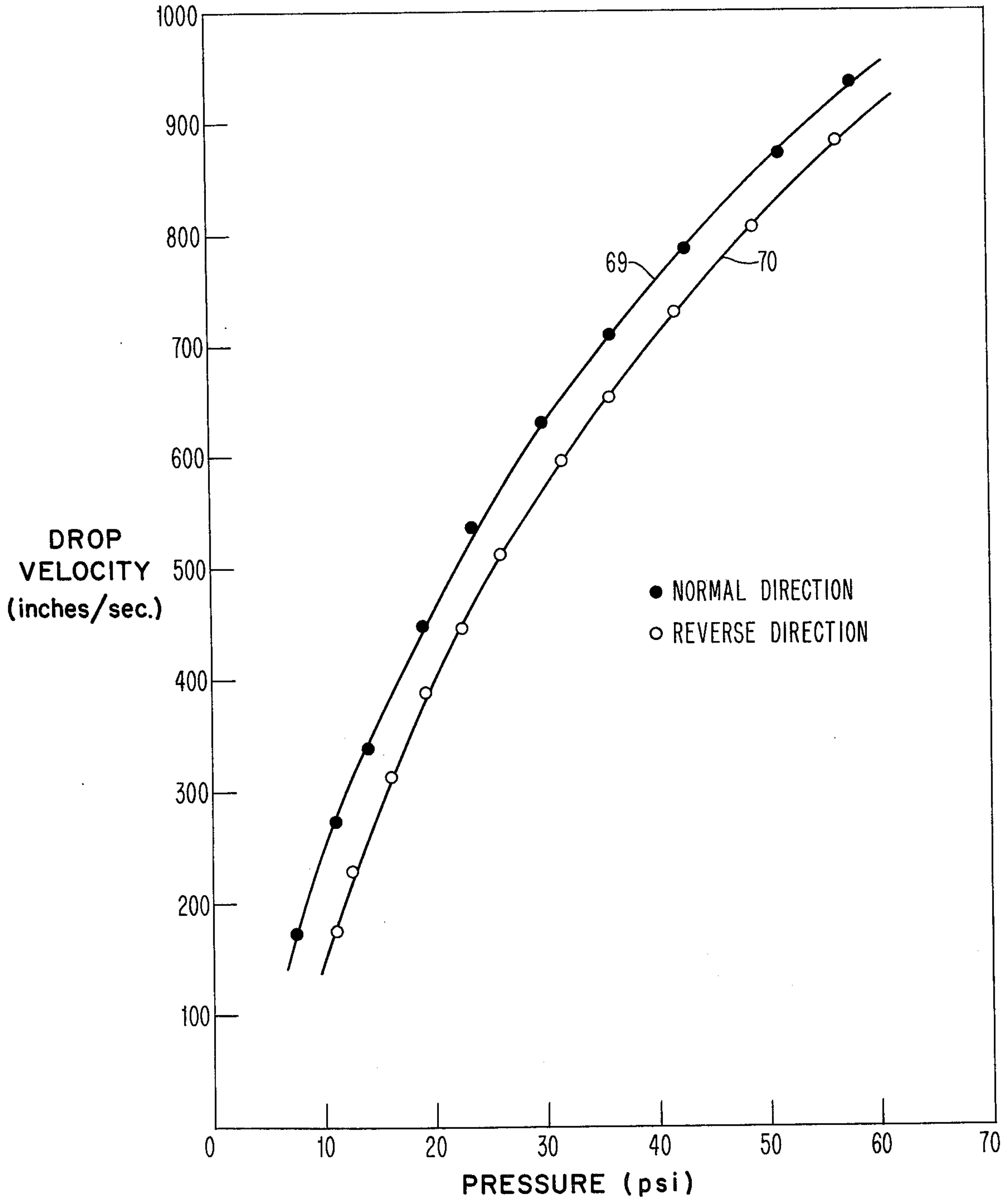
FIG. 8 is a graph which is a plot of droplet velocity versus pressure for normal and reverse flow of fluid through a jet nozzle according to the present invention.

Refer now to FIGS. 6–8. FIG. 6 illustrates fluid flow in a normal direction through a nozzle 67, that is, fluid flows from the larger rectangular aperture to the smaller rectangular aperture, whereas FIG. 7 illustrates fluid flow in the reverse direction, that is, from the smaller aperture to the larger aperture of a nozzle 68. For small nozzles, that is nozzles of less than 1 mil, measurements of drop velocity as a function of head pressure are found to be different for the two flow directions as illustrated in FIG. 8, wherein curve 69 represents normal flow and curve 70 represents reverse flow for a square nozzle with a side dimension of about 0.6 mils. The fact that at a given pressure the drop velocity is less in the reverse direction than in the normal direction is unexpected in the ink jet nozzle art area, since one would intuitively expect the opposite to be true. This is so since in the reverse direction the exit aperture appears more as a classical orifice to the ink supply. If flow rates are measured, it is found that the fluid flow is also greater in the normal direction. Therefore, the tapered rectangular nozzle appears to have better drop velocity characteristics than does a classical knife-edged orifice.

Figure 9:
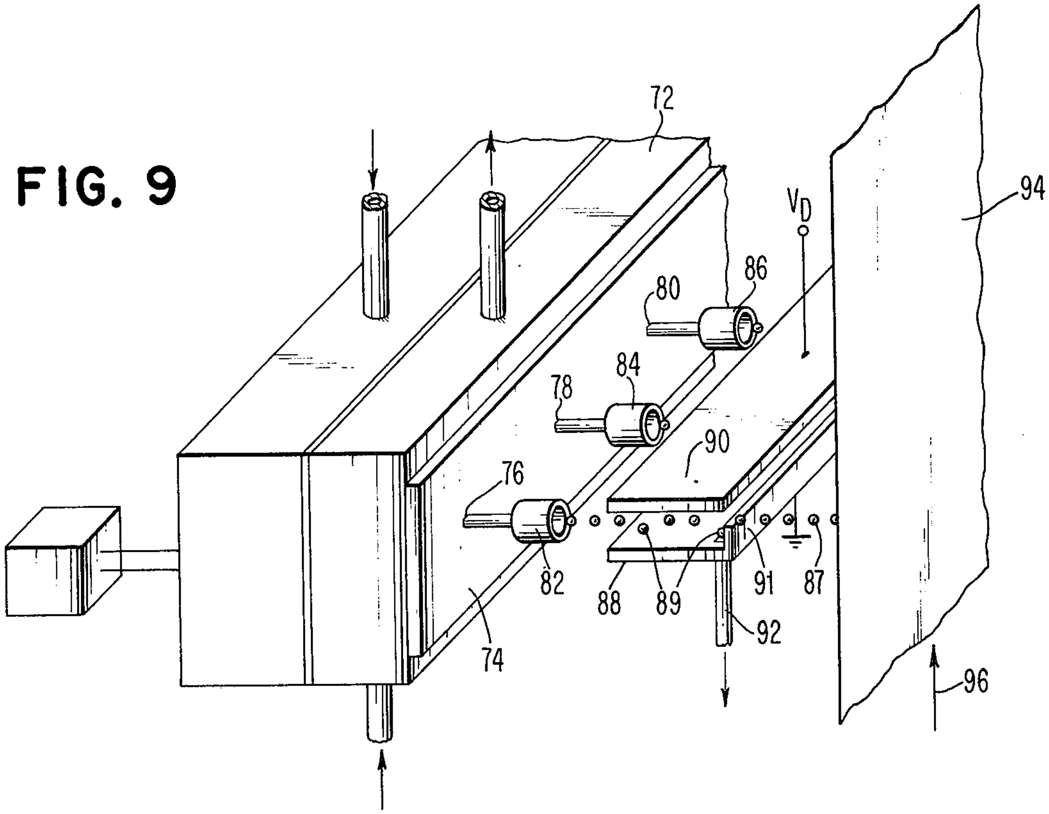
FIG. 9 is a schematic diagram of an ink jet printing system utilizing an array of fluid nozzles according to the present invention.

Refer now to FIG. 9, which illustrates a jet nozzle array in accordance with the present invention. A manifold means 72 has a nozzle chip 74 affixed thereto with nozzles 76, 78 and 80 etched therein in accordance with the process previously described. Streams of ink from the respective nozzles pass through charge electrodes 82, 84 and 86, respectively, with charged droplets not being used for printing, and with uncharged droplets being used for printing. All droplets pass through common deflection plates 88 and 90 with the charged droplets 89 striking a gutter 91 and returning through fluid line 92 to an ink reservoir (not shown) and the uncharged droplets 87 being undeflected and consequently passing over gutter 91 directly to predetermined positions on a paper target 94 which is moving in the direction of the arrow 96.

Figure 10:
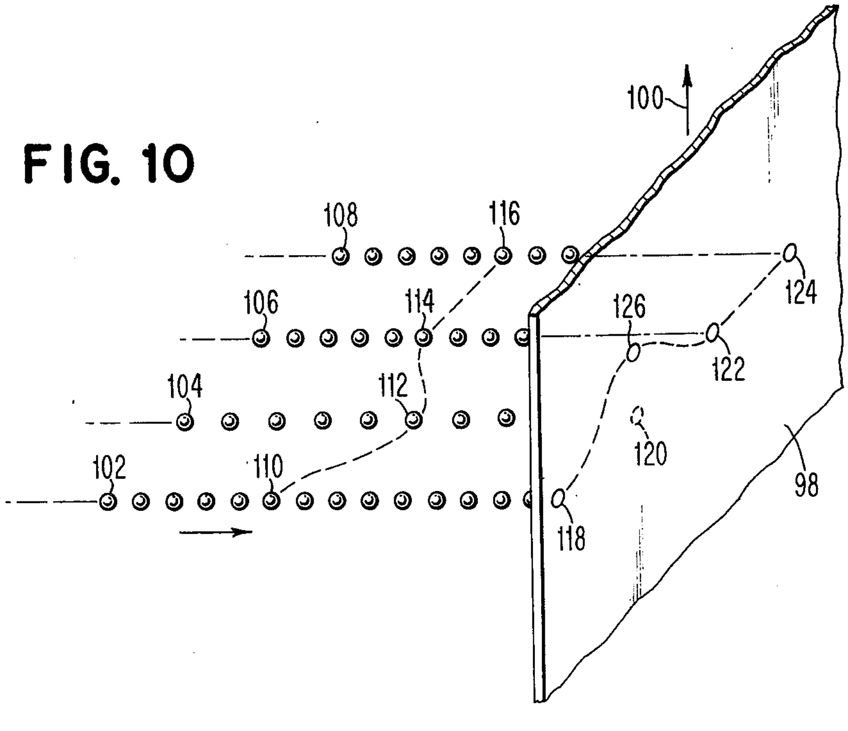
FIG. 10 is a pictorial representation illustrating the effects of velocity non-uniformity in an ink jet printing system.

One of the prime considerations when fabricating an array of jet nozzles is whether or not there is velocity uniformity with respect to the velocity of the droplets emitted from the respective nozzles. If there is a lack of velocity uniformity, there is an attendant misregistration of droplets on the paper which results in poor print quality. With reference to FIG. 10, a paper 98 is illustrated moving in the direction of an arrow 100, with a plurality of droplet streams 102, 104, 106 and 108 being illustrated. For purposes of description, it is assumed that the drop velocity of the streams 102, 106 and 108 is uniform whereas the drop velocity for the stream 104 is greater. This is seen with reference to the sixth droplet, 110, 112, 114 and 116 in the respective streams. If there is uniformity of drop velocity, the droplets impinge on the paper 98 in substantially a straight line, resulting in ink markings 118, 120, 122 and 124 on the paper 98. The ink marking 120 is illustrated in phantom since the droplet 112 is actually travelling at a higher velocity and does not impinge at the area of the ink marking 120. Instead, the droplet 112 strikes the paper 98, resulting in an ink marking 126 which causes skewing of the print line. This is so since the droplet 112 hits the paper 98 prior to the other droplets and accordingly the paper 98 has moved in an upward direction prior to the impingement of the following droplets.

Figure 11:
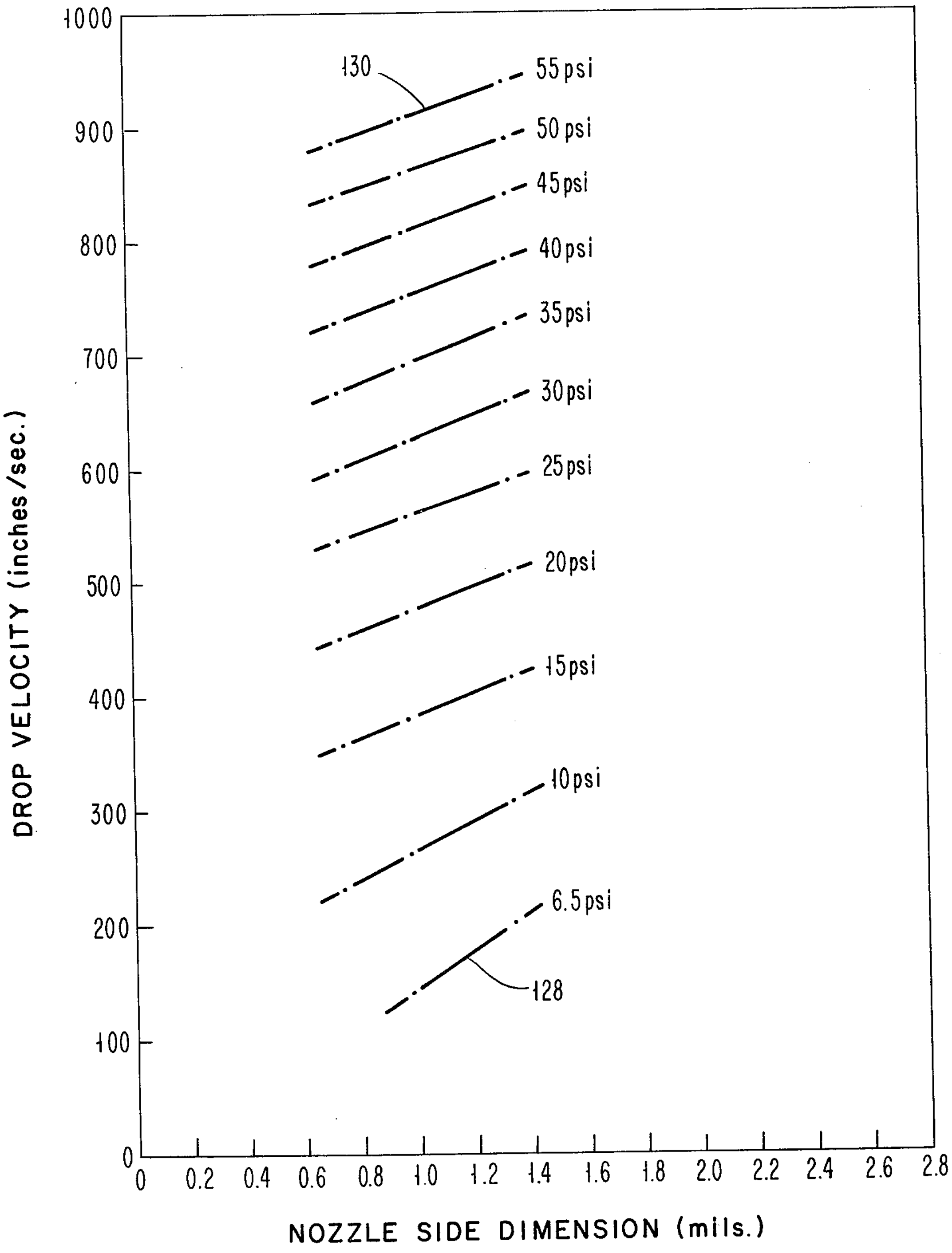
FIG. 11 is a graph of drop velocity versus nozzle size at constant pressure for different square tapered nozzle aperture dimensions.

In an array of jet nozzles it must be determined what effect nozzle size uniformity has with regard to velocity uniformity. FIG. 11 is a graph of drop velocity plotted versus nozzle size for various constant pressures for a different size tapered rectangular nozzles. A wide range of pressures are plotted beginning at a 6.5 psi illustrated by the curve 128 through 55 psi illustrated by the curve 130. It is seen over the range of nozzle sizes and pressures plotted that the respective curves are substantially linear.

Figure 12:
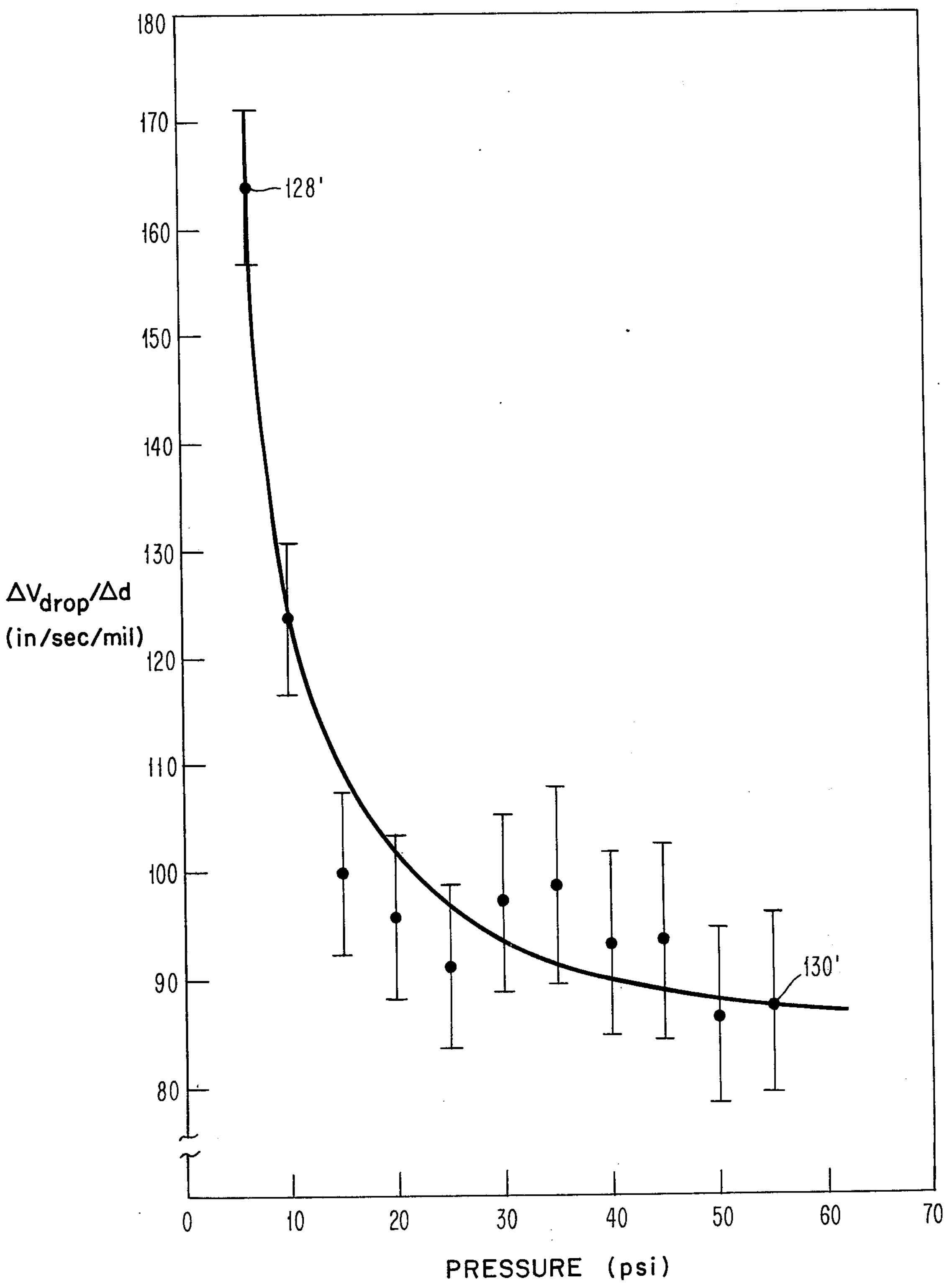
FIG. 12 is a plot of the slopes of the curves of FIG. 11 plotted as a function of pressure for determining the sensitivity of drop velocity to changes in nozzle size.

FIG. 12 is a graph in which the slopes of the curves illustrated in FIG. 11 are plotted as a function of pressure, with the point 128' and the point 130' corresponding to the slopes of the lines 128 and 130, respectively, of FIG. 11. It is seen that for above a pressure of 10 psi the sensitivity of drop velocity to changes in nozzle size is approximately 100 inch/sec/mil. This illustrates that the requirements on the nozzle size uniformity with regard to velocity uniformity for a nozzle array according to the present invention are not too demanding. That is, there may be variations in respective nozzle size within an array, which do not substantially affect the velocity uniformity and accordingly the print quality. This is not necessarily so for known tubular nozzles.

Figure 13:
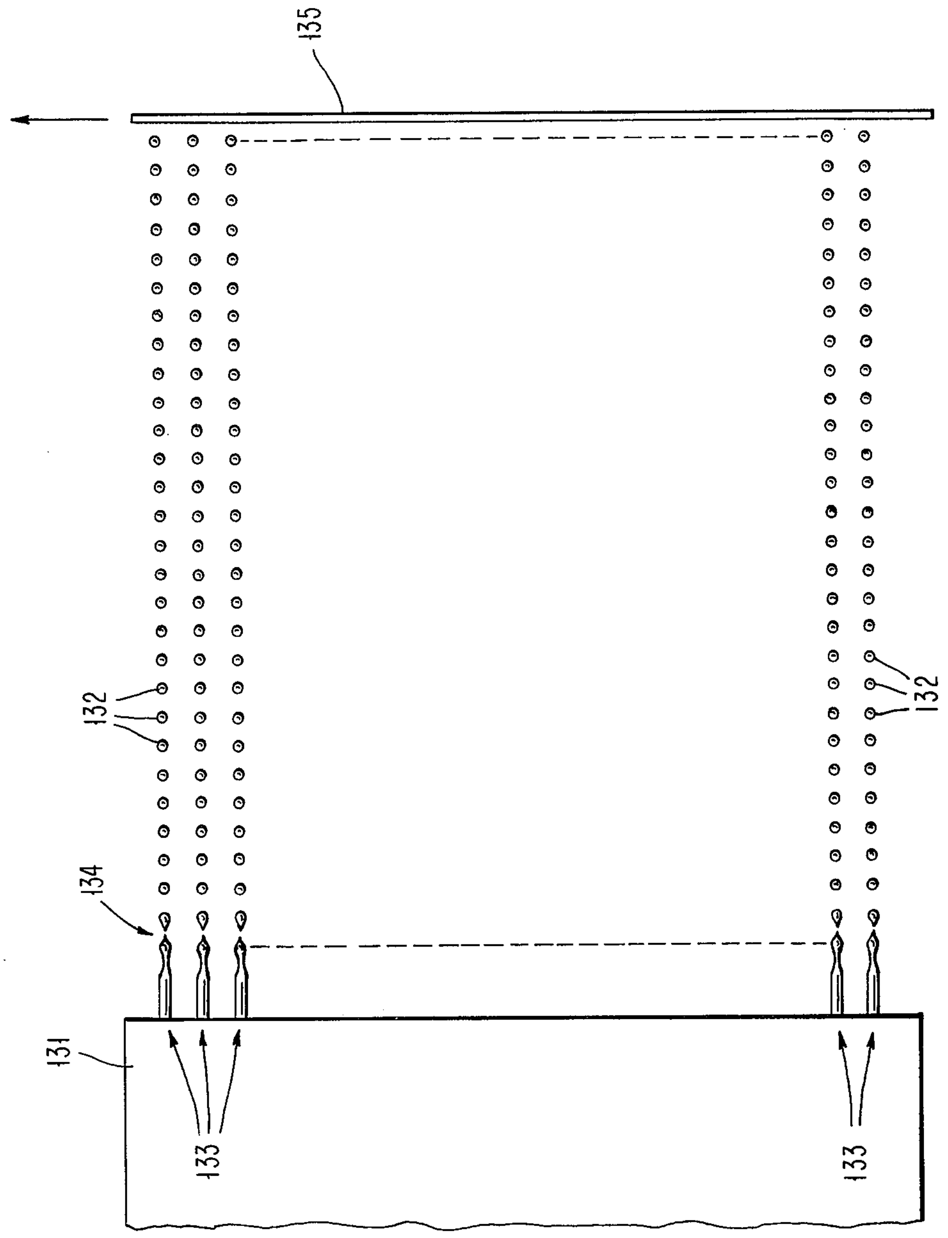
FIG. 13 is a pictorial representation of fluid streams and streams of droplets which are emitted from a nozzle array according to the present invention.

FIG. 13 is a pictorial representation of a plurality of fluid droplet streams being emitted from an array of nozzles 131 fabricated in accordance with the present invention. It is seen that the individual droplets 132 in each stream 133 are formed at substantially the same point as illustrated at 134, and that there is good directionality, that is parallelism, between the respective fluid streams as they travel towards a paper target 135.

In summary, an ink jet printing system has been disclosed wherein a single nozzle or an array of nozzles having a predetermined geometry are formed in a semiconductor material, wherein the break off uniformity, velocity uniformity and directionality of the respective ink jet streams results in a high print quality.

What is claimed is:

1. In an ink jet printing system, the combination comprising:

a source of pressurized ink;

a manifold means communicating with said sources;

means for perturbing the ink at a substantially uniform frequency; and a substrate having at least one nozzle formed therein, with said one nozzle having walls formed in said substrate in the shape of a truncated pyramid, wherein the entrance and exit apertures of said one nozzle each have a rectangular cross-section coextensive with the respective faces of said substrate, with said walls each having a continuous taper extending from one face to the other face of said substrate, with said entrance aperture communicating with said manifold means for receiving ink under pressure, and with said exit aperture emitting a stream of ink which then breaks up to form ink droplets.

2. The combination claimed in claim 1, wherein said substrate is comprised of a semiconductor material.

3. The combination claimed in claim 2, wherein said semiconductor material is monocrystalline silicon.

4. The combination claimed in claim 3, wherein the silicon is coated with a corrosion-resistant film.

5. The combination claimed in claim 2, wherein said semiconductor material is germanium.

6. The combination claimed in claim 2, wherein said semiconductor material is gallium arsenide.

7. In an ink jet printing system, the combination comprising:

a source of pressurized ink;

manifold means communicating with said source;

means for perturbing the ink at a substantially uniform frequency; and a nozzle having walls formed in a substrate, with said walls being in the shape of a truncated pyramid, wherein the entrance and exit apertures each have a rectangular cross-section coextensive with the respective faces of said substrate, with said walls having a continuous taper from one face to the other face of said substrate, with said entrance aperture communicating with said manifold means for receiving ink under pressure, and with said exit aperture emitting a stream of ink initially having an essentially rectangular cross-section area, said stream changing in cross-sectional shape to essentially circular, in response to surface tension on said stream.

8. The combination claimed in claim 7 wherein the corners of the entrance and exit apertures are rounded.

9. The combination claimed in claim 7, wherein said nozzle has entrance and exit apertures which are essentially square in cross-section.

10. The combination claimed in claim 9, wherein said substrate is comprised of a semiconductor material.

11. The combination claimed in claim 10, wherein said semiconductor material is coated with a corrosion resistant material.

12. The combination claimed in claim 10, wherein said semiconductor material is monocrystalline silicon.

13. In an ink jet printing system, the combination comprising:

a source of pressurized ink;

manifold means communicating with said source;

means for perturbing the ink at a substantially uniform frequency; and an array of ink jet nozzles formed in a substrate, with each of said nozzles having walls formed in said substrate in the shape of a truncated pyramid, with the entrance and exit apertures of each nozzle having a rectangular cross-section coextensive with the respective faces of said substrate, with the walls of each nozzle having a continuous taper from one face to the other face of said substrate, with the entrance aperture communicating with said manifold means for receiving ink under pressure and with the exit aperture emitting a stream of ink, with each individual stream from the respective nozzles breaking up at substantially the same distance from the respective exit apertures for forming ink droplets, and with the respective streams of droplets being in substantial parallel alignment with one another.

14. The combination claimed in claim 13, wherein said array of ink jet nozzles are formed in a semiconductor substrate.

15. The combination claimed in claim 14 wherein the corners of the entrance and exit apertures are rounded to minimize stress concentrations.

16. The combination claimed in claim 15, wherein said semiconductor substrate is monocrystalline silicon.

17. The combination claimed in claim 16 wherein the exit apertures of the respective nozzles are substantially square in cross-section.

18. In an ink jet printing system, the combination comprising:

a source of pressurized ink;

manifold means communicating with said source;

means for perturbing the ink at a substantially uniform frequency; and an array of ink jet nozzles formed in a semiconductor substrate, with each of said nozzles having walls formed in said substrate in the shape of a truncated pyramid having entrance and exit apertures of rectangular cross-section coextensive with the respective faces of said substrate, with the walls of each nozzle having a continuous taper from one face to the other face of said substrate, with the corners of the entrance and exit apertures and the wall interfaces of the respective nozzles being rounded to minimize stress concentration, and with the entrance aperture communicating with said manifold means for receiving ink under pressure and with the exit aperture emitting a stream of ink which changes from an initial rectangular cross-section to an essentially circular cross-section, in response to surface tension on the stream, with each individual stream from the respective nozzles breaking up at substantially the same distance from the respective exit apertures, and with the respective streams of droplets being in substantial parallel alignment with one another.

19. The combination claimed in claim 18 wherein said semiconductor substrate comprises monocrystalline silicon.

20. The combination claimed in claim 19 wherein the exit apertures of the respective nozzles are substantially square in cross-section.

* * * * *